Patented June 29, 1954

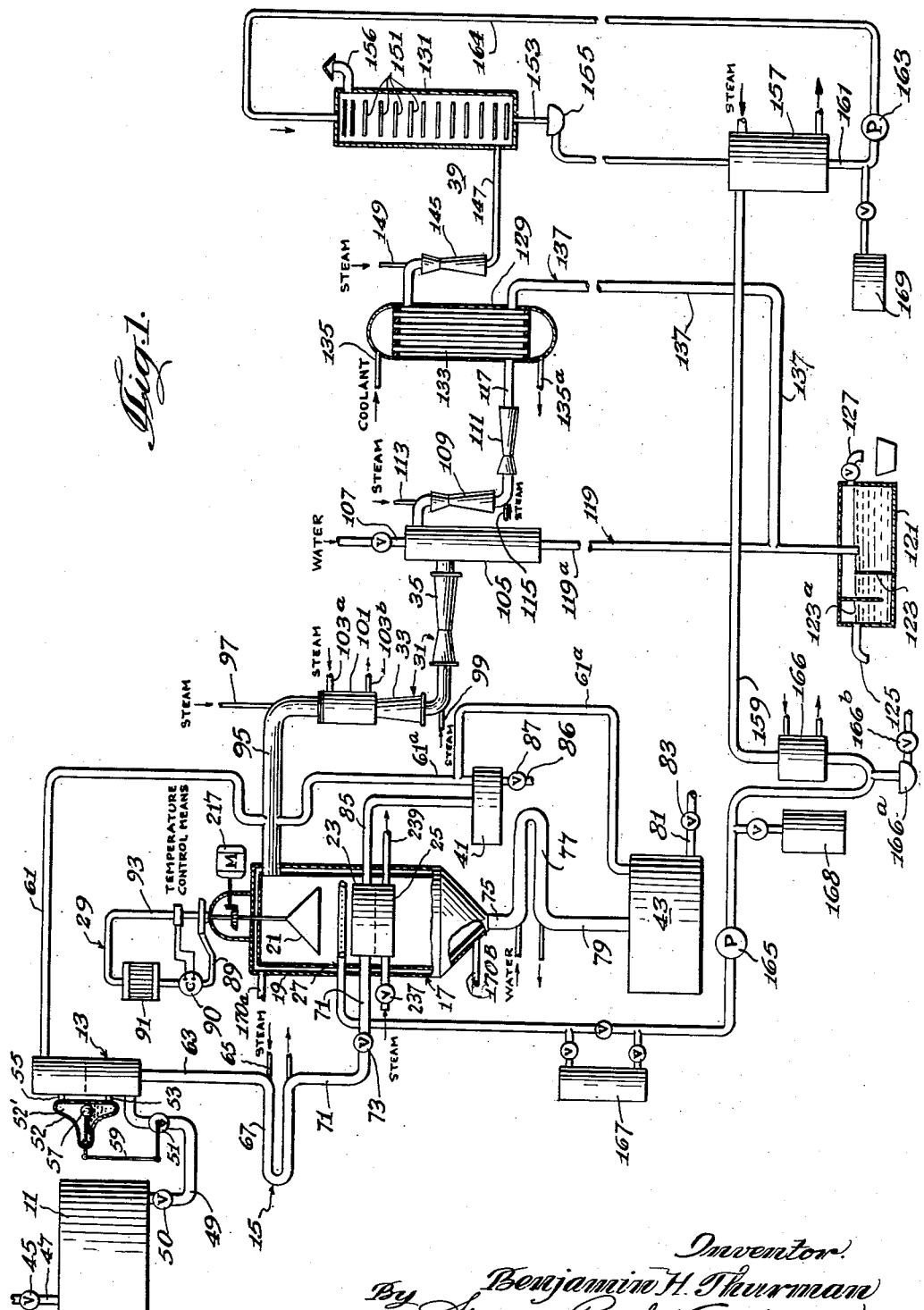

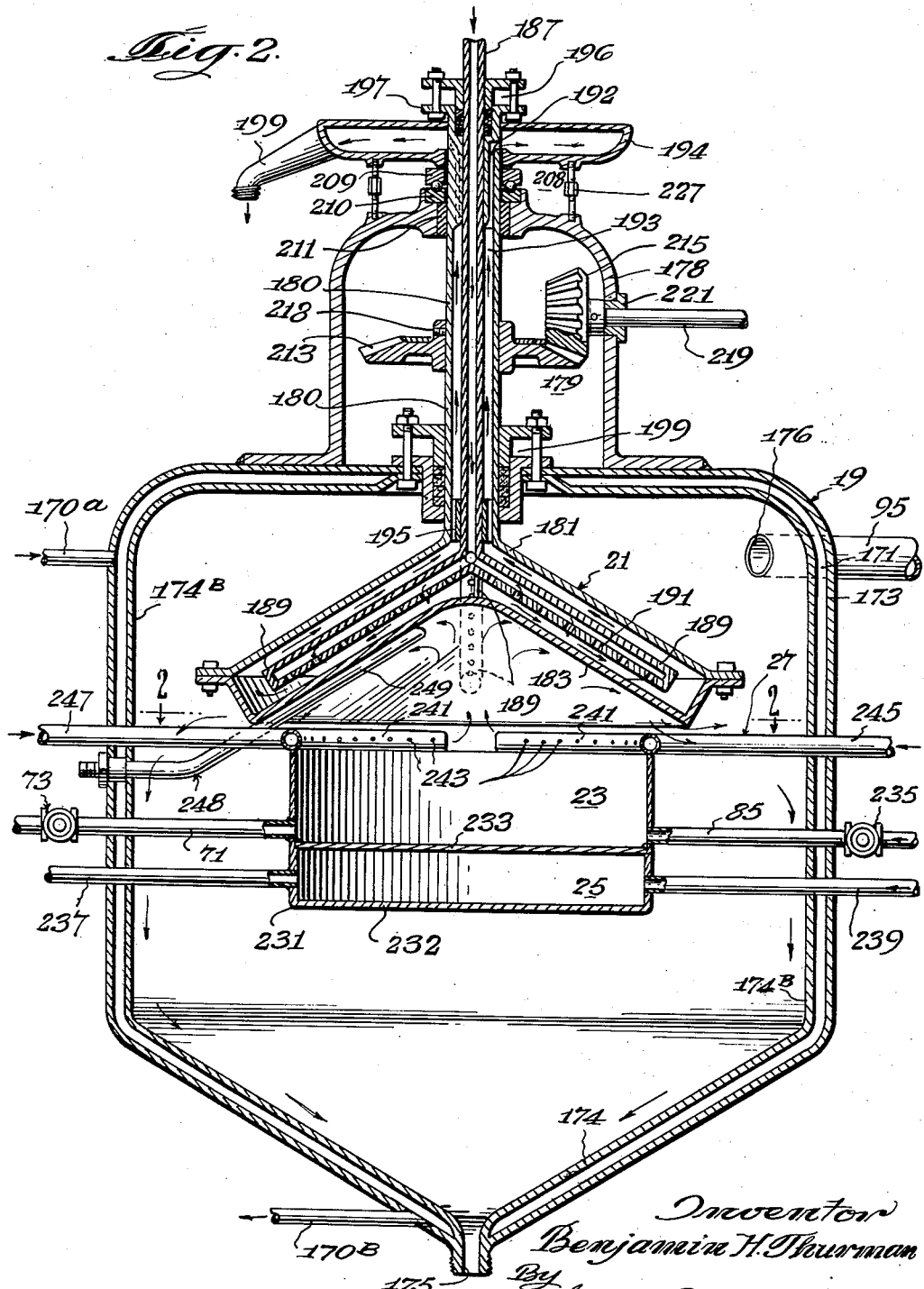

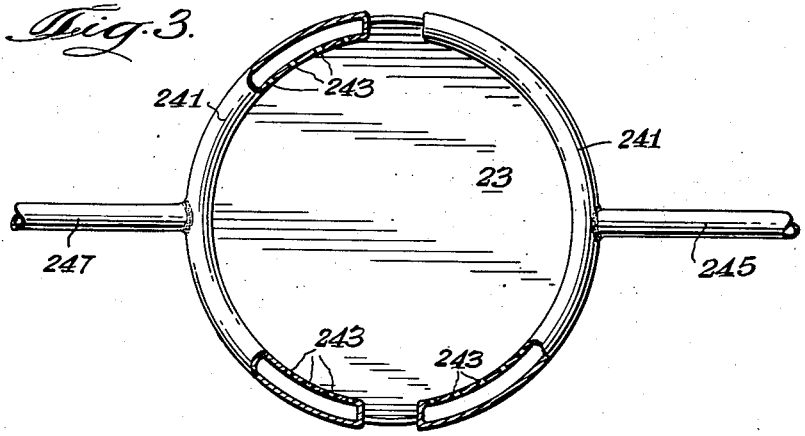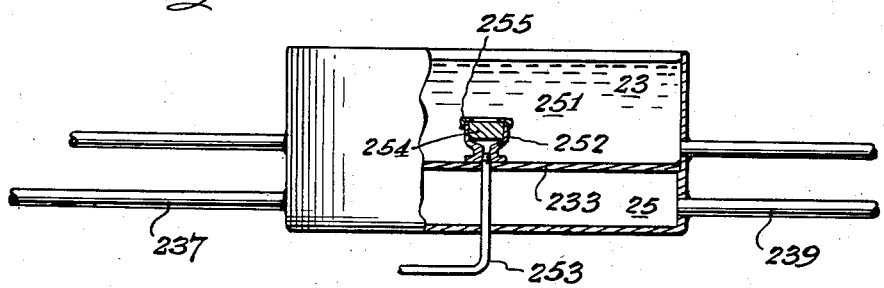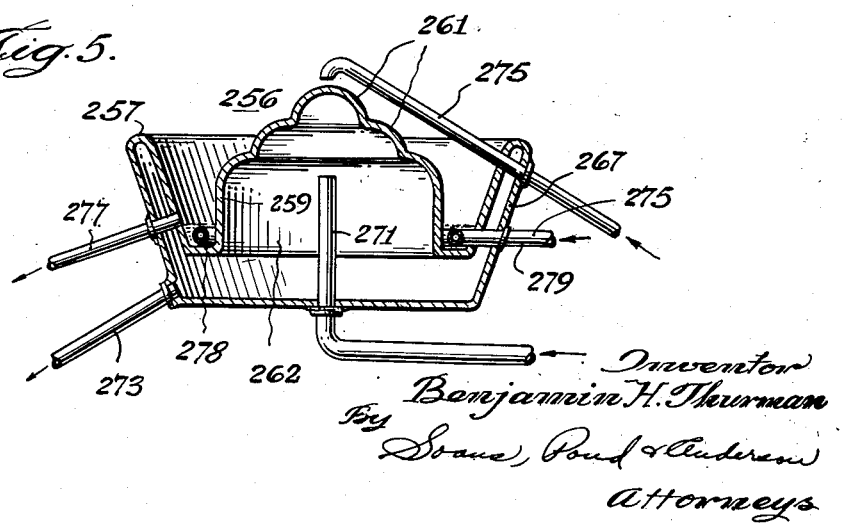

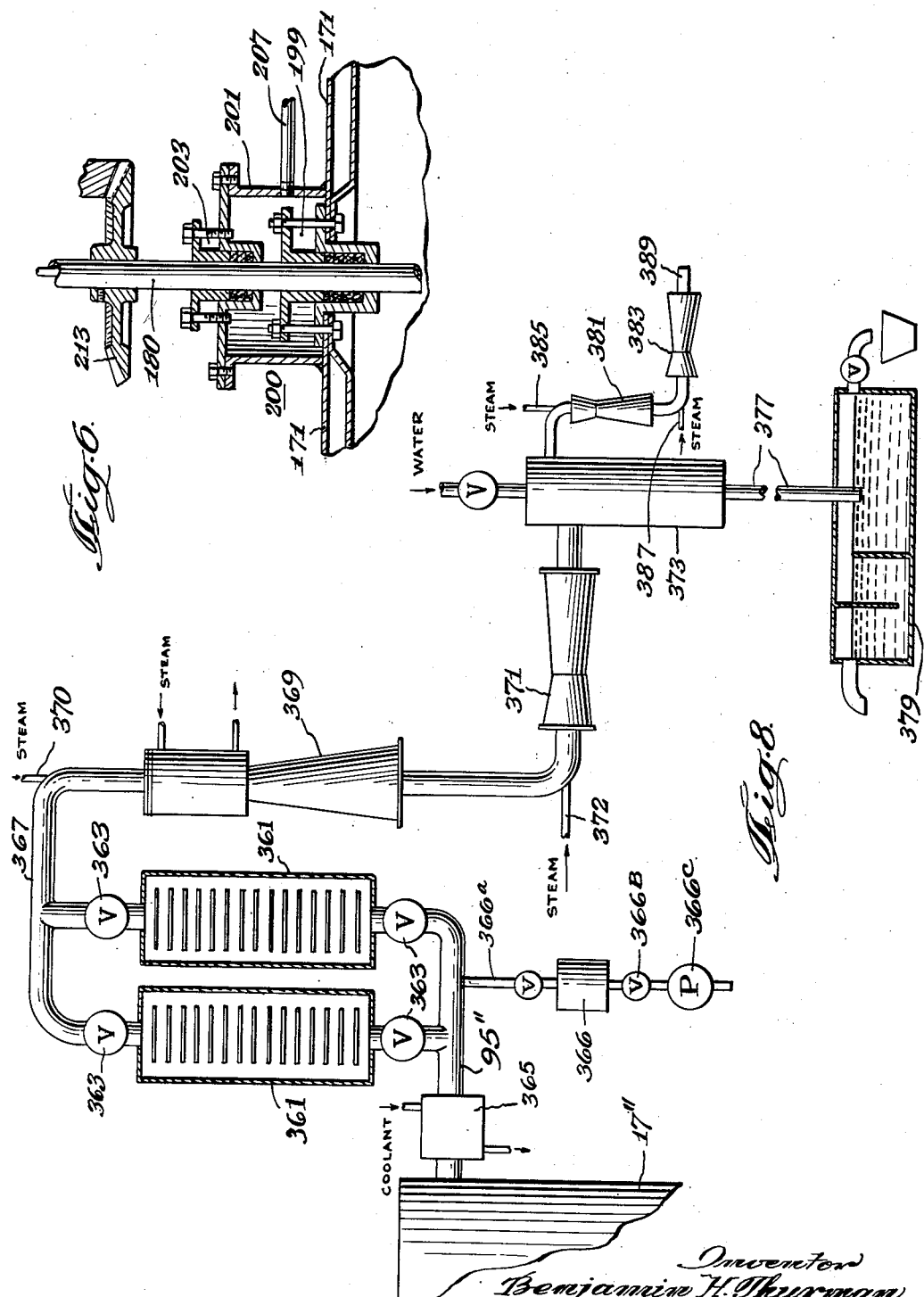

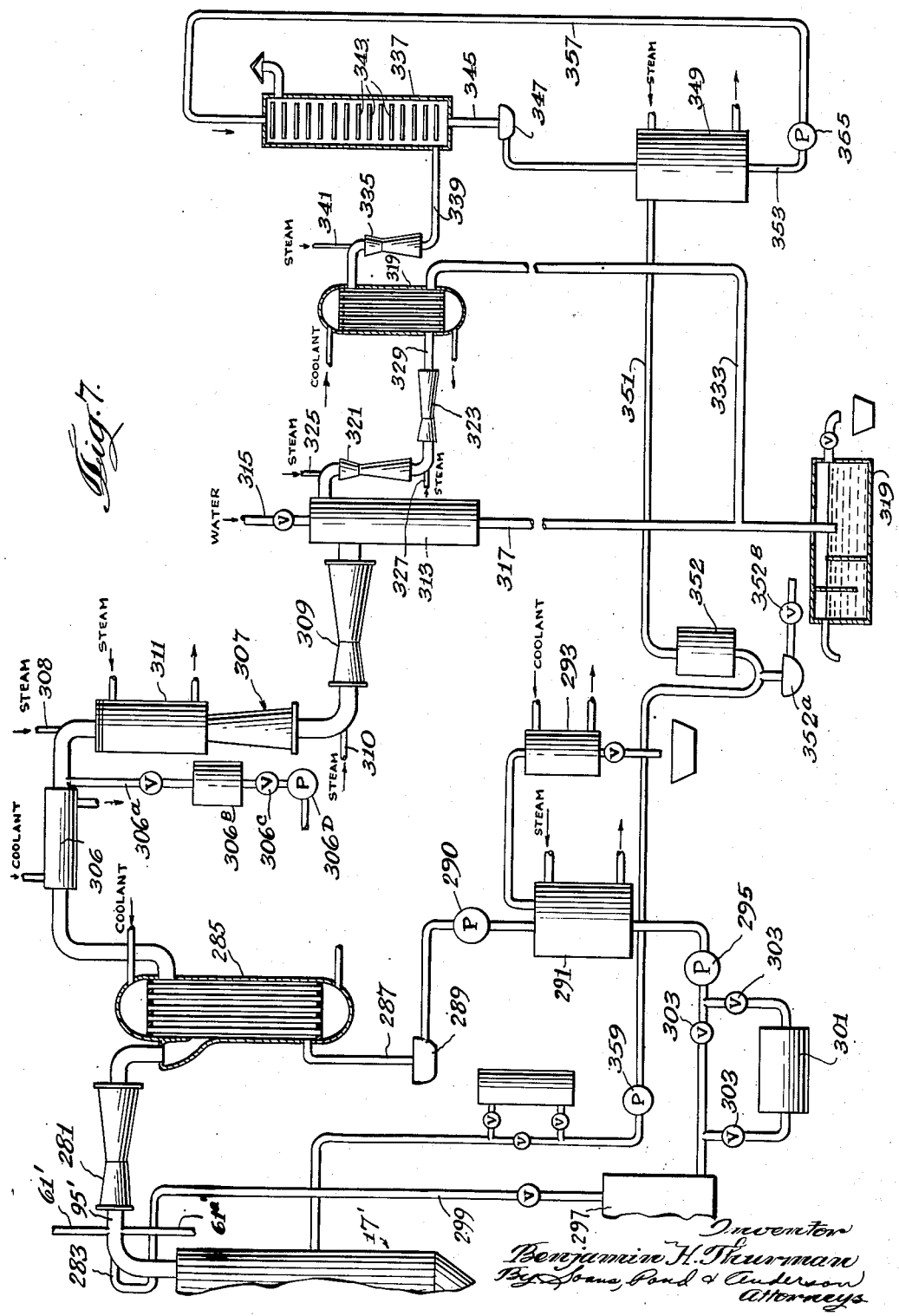

2,682,499

UNITED STATES PATENT OFFICE 2,682,499

HIGH VACUUM DISTILLATION AND DRYING SYSTEM

Benjamin H. Thurman, New York, N. Y., assignor to Kraft Foods Company, Chicago, Ill., a corporation of Delaware Application March 20, 1950, Serial No. 150,672

1 Claim. (Cl. 202—183)

In general, the present invention relates to distillatory and drying systems, and more particularly, it relates to apparatus and methods for carrying-on distillatory and drying operations under very high vacuum conditions.

The arts of distillation, evaporation and drying are centuries old, but the accomplishment of these processes at pressures below about 1 to 5 mm. of mercury is a relatively new field that has attained important industrial significance, chiefly since the advent of high-capacity vacuum-producing means and the development of various, improved high-vacuum distillatory procedures and apparatus, including molecular and short-path stills. As will hereinafter appear, the present invention is directed especially to distillation apparatus of the short-path type and to procedures involving the use of such apparatus.

The development of high-capacity vacuum-producing means which can be operated to maintain low pressures at relatively high rates of input (rate of input being defined in this art as the total amount of all gases and vapors introduced into a vacuum system by vaporization, chemical reaction, leakage, internal desorption or out-gassing, etc., in any given time), and the accompanying development of molecular and short-path type stills and distillatory processes involving the use of such stills have made possible important new uses of high-vacuum distillation procedures. For example, these developments have made possible the drying, without injury, of heat-sensitive materials such as blood plasma, penicillin, streptomycin, fruit juices, animal glands and gland extracts, vaccines, and many other materials. In addition, volatile, heat-sensitive substances, including vitamins, high-molecular weight plasticizers, fatty acids, and the like, can be distilled without decomposition, cracking, polymerization, or other substantial molecular modifications, and various materials can be dried from frozen suspensions without shrinkage, and without substantially affecting a desired geometric construction, as in the case of gels. Moreover, various reaction processes requiring such a high temperature at atmospheric pressures that the design of reactors is difficult or impractical, can be carried out in high vacuum systems at low temperatures, thereby permitting the recovery of valuable reaction products or other materials.

Theoretically, the highest possible degree of efficiency is reached in a single-pass high-vacuum distillation procedure when the distillation apparatus is being operated under the conditions of the theoretical mean effective plate (TMEP). These conditions exist, and an efficiency of one TMEP theoretically results, when (1) the condenser surface is indefinitely close to the evaporating surface, (2) the vapor molecules depart from the liquid at intervals such that there are no collisions in travel from the liquid interface to the surface of the condenser, i. e. the vaporized molecules travel directly to the condenser surface and (3) the evaporation proceeds at a sufficiently low rate that the surfaces of the liquid are truly representative of the bulk of the distilland.

Known high efficiency, high vacuum stills, such as the molecular-type stills, do not operate under these exact conditions, and the efficiency of such stills does not equal the efficiency of a TMEP. However, the operating conditions of molecular-type stills may approach those necessary to attain an efficiency of one TMEP, and as a result, the still efficiency may likewise approach the TMEP efficiency.

Generally, a still is considered to be a molecular-type still when the distance between the surface of the distilland and the condenser approaches the mean, free path of vapor molecules of the material being distilled under existing operating conditions, the term "mean free path" having in this definition its accepted meaning of the average distance each molecule moves before colliding with another molecule.

In the short-path still, which is the other principal type of high-vacuum still, there is an even greater departure from the conditions necessary to attain efficiency of one TMEP for single-pass distillation, and because of this, such stills are somewhat less efficient than molecular stills from the standpoint of recovery of the maximum theoretical amount of distillate. However, the short-path still may be more readily adapted to handle large amounts of distilland, i. e. it may be operated at high rates of throughout, and relatively large amounts of distillate can be recovered therein. As a result, most high capacity, high-vacuum stills, and especially those used for handling large quantities of material on a commercial basis, are short-path stills.

In stills of the short-path type, the condenser is usually located closely adjacent the surface of the distilland, and the path between the two is substantially unobstructed. High-vacuum, which is often as low as a few microns of mercury, is maintained in the still, are relatively high efficiency of recovery at high rates of throughput is possible during the operation of this apparatus.

However, in the short-path still, the distance between the liquid surface and the condenser is materially greater than the mean, free path of the molecules. An example of a short-path still is disclosed in my co-pending application Serial No. 541,603, (Pat. 2,538,540, January 16, 1951), which was filed on June 22, 1944, and which has been assigned to the assignee of this invention, and the present application is a continuation in part of this application.

The present invention, as previously pointed out, is concerned primarily with the improvement of short-path, high-vacuum stills, and in important novel feature of the invention consists in the introduction of a gas into the still during the operation thereof. This gas, which for convenience I prefer to designate a "carrier gas" has been found to aid materially in increasing the efficiency of operation of short-path stills generally, and in this connection, it is important to note that the introduction of a gas into high vacuum apparatus is contrary to the more generally accepted teachings in this art.

In considering the theoretical aspects of the use of a carrier gas in short-path stills in accordance with the invention, the improved results are found to be consistent with the theory set forth previously with respect to theoretical mean effective plate. More particularly, even though operational or engineering limitations dictate the use of a condenser which is spaced some distance from the distilland, that distance can, in effect, be shortened, to more nearly approximate the first operational requirement for achieving the separation efficiency of a TMEP, by insuring immediate and continuous travel of the vapor molecules to the condenser surface, as by supplying those molecules with external directed energy. This external energy may be supplied by the added gas whose directed molecules collide with the molecules of vapor and assist their travel from the surface of the liquid to the condenser, thus accomplishing a "carrier" function. In addition, through the use of a carrier gas, negative collisions of the molecules in flight, i. e., collisions which would tend to prevent a molecule of vapor from reaching the condenser, will be reduced or compensated for by the directed carrier gas. Consequently, more efficient distillation, in accordance with the second operational requirement of a TMEP listed above, is also accomplished.

The third requirement for achieving the efficiency of a TMEP, i. e. that the surface of the liquid be representative of the composition of the distilland, is not substantially affected by the use, within the still, of a carrier gas which is moved across the surface of the distilland. However, if the carrier gas is passed through the liquid, it tends to agitate the distilland and maintain the composition of the surface substantially the same as the body of the liquid. When this is done, the carrier gas serves a dual function of aiding in carrying the vaporized distillate to the condenser and of maintaining the consistency of the surface of the distilland. It is thus apparent that the improved results obtained through the use of carrier gas are consistent with the teachings of distillation. As a result, various vitamins, hormones, and other heat sensitive materials may be concentrated in commercial quantities by simple distillation, in place of the presently known and relatively expensive chemical processes. On the other hand, when temperature is not a critical limitation, carrier gases can be used to substantially increase the rate of distillation or drying at given temperatures.

When a carrier gas is employed in accordance with the invention to provide improved distillation and drying, care must be taken to prevent contamination of the material being processed and the vapors evolved. Accordingly, the carrier gas should be non-reactive with the material and vapors. In addition, since it is usually desirable to recycle the carrier gas during the distillatory operation, it will generally be found advantageous to purge continuously the carrier gas of the various materials which are liberated from the material being processed and which do not condense upon the surface of the condenser. Moreover, in order to minimize the load which is placed upon the vacuum apparatus by the admixture of the carrier gas and the liberated non-condensibles, it is sometimes desirable to effect separation of the carrier gas from the non-condensibles ahead of most of the vacuum pumps. This separation may be accomplished by absorption, by freezing, or by chemically reacting the admixture of gases with a reagent which combines with the carrier gas.

I have further discovered that more effective recovery of heat sensitive materials in high-vacuum distillatory processes, and especially in short-path stills, can be accomplished by introducing a low-boiling point liquid having a high vapor pressure, e. g. steam, ether, etc., into a vacuum still with the distilland. When this is done, the distilland boils at a substantially lower temperature, and the heat sensitive materials may be recovered at substantially lower temperatures. The action is most effective when an immiscible liquid is added. Moreover, it appears that the vapors of the added liquid, which may leave the surface of the mixture at relatively high velocity, are capable of acting as a carrier gas to effect improved separation.

As above noted, the introduction into a high vacuum system, i. e. a system operated at a pressure below 5 mm. of mercury, of a carrier gas or a material capable of liberating a carrier gas when subjected to the conditions existing within the still is definitely contrary to most of the teachings of the art. In accordance with presently known practices, every effort is made to limit the input of gases into the vacuum system as by stopping leaks, heating distillands prior to entry to the system to effect preliminary outgassing, etc.

In high vacuum systems, vapor molecules acquire very high velocities, and it is desirable to provide means for increasing the rate and effectiveness of molecular contacts with the condenser surface. In the preferred structure of the invention, this is accomplished by the use of a rotating condenser, which may be of novel design.

The principal object of the present invention is to provide an improved method and apparatus for accomplishing distillation, drying, and evaporation by the use of short-path distillatory apparatus. A more specific object of the invention is the provision of an improved distillatory system which employs a carrier gas, introduced into the still during its operation, to accomplish improved distillatory separations at lower temperatures than have heretofore been obtained, thereby permitting recovery of additional heat sensitive compounds.

An additional object is to provide distillatory and drying systems, and especially short-path distillatory and drying systems, which employ a carrier gas, and wherein the non-condensibles evolved in the distillation or drying process are continuously removed from the system. A still further object of the invention is to provide improved high-vacuum distillatory apparatus having provision for using a carrier gas and for effectively separating out such gas without unduly loading the vacuum-producing equipment. Other objects and advantages of the invention will become apparent by reference to the accompanying drawings and subsequent description of certain exemplary embodiments of the invention.

In the drawings:

Fig. 1 is a schematic diagram of an apparatus for carrying out continuous distillatory processes in accordance with the present invention;

Fig. 2 is a side view, in section, of an improved still of the short-path type, which includes means for dispersing a carrier gas across the surface of the distilland;

Fig. 3 is a plan view, partially in section, of the gas dispersing means shown in the previous figure;

Fig. 4 is an elevational view, partially in section, of an evaporating pan which is suitable for use in systems such as that illustrated in Figure 1, and which has a modified gas dispersing means disposed therein;

Fig. 5 illustrates a modified evaporating means, in cross section, for the still shown in Fig. 2;

Fig. 6 is a sectional view of a modified seal also adapted for use in the still shown in Fig. 2;

Fig. 7 is a schematic diagram, similar to Fig. 1, of a modified apparatus for carrying out continuous distillatory processes in accordance with certain features of the present invention; and Fig. 8 is a schematic diagram of another modified apparatus for carrying out distillatory processes in accordance with certain other features of the invention.

The distillation systems illustrated in the drawings have many applications in various high vacuum distillatory operations, and with minor modifications, can be used for drying and other processes. However, to illustrate the present invention, the systems will be described as used for the distillatory separation of certain of the components of the by-products which results from the practice of the glyceride oil de-odorization process disclosed in my copending application, Serial No. 744,846 (abandoned), which was filed on April 30, 1947. This by-product, which may be a product of soya oil deodorization, contains various unsaponifiable materials such as sterols, carotenoid pigments, etc., and a substantial amount of fat soluble vitamins, including tocopherols (vitamin E). In the operation of the system to be described, the tocopherols are separated from the unsaponifiables, under high vacuum and at a relatively low temperature to prevent modification of the materials being processed.

Referring more particularly to the drawings, Figure 1 illustrates a complete apparatus or system especially designed for producing a distillate having a high percentage of tocopherols from a by-product fraction such as that obtained from the soya oil deodorization process referred to above. The system is adapted for operation at a vacuum of less than about 1 mm. of mercury and particularly in the range of from 0.25 to 0.50 mm. of mercury. In this figure, 11 indicates a storage tank for the by-product material to be treated; 13 designates a constant level tank for feeding oil to the system; 15 indicates a heat exchange device for pre-heating the by-product or distilland leaving the tank 13; and 17 designates in general, a high vacuum still including a vacuum tight casing 19, a rotating condenser 21, an evaporating pan 23, a heater 25 which heats the distilland in the pan 23, and means 27 for injecting a carrier gas into the still. To clarify the illustration, the evaporating pan 23, the condenser 21, and the gas injecting means 27 are shown in exploded or spaced-apart relation in Figure 1. Numeral 29 indicates means for supplying a coolant to the condenser 21; 31 indicates, generally, vacuum producing apparatus including vacuum boosters or thermocompressors 33 and 35; 39 designates, in general, apparatus for recovering the carrier gas introduced into the still; 41 designates a receiving tank for the residue from the still 17 which, in the operation to be described, primarily comprises glyceride, fatty acids, sterols, etc.; and 43 denominates a tank for storing distillate, comprising a relatively high percentage of tocopherols.

The described by-product material usually contains from 6 to 10% tocopherols. Conveniently, this material enters the distillatory system through control valve 45 and pipe 47, and it is stored in suitable quantities in the storage tank 11. During operation, the by-product material to be distilled (the distilland) is conducted from the storage tank 11 into the constant-level feed tank 13 through a pipe 49 which is provided with a shut-off valve 50, as illustrated. A float controlled valve 51 is located in pipe 49 intermediate the tanks 11 and 13, and this valve is operative to maintain a constant level of liquid in the feed tank 13.

In order to control the delivery of distilland to the system, the valve 51 is arranged to be operated by a constant level regulator 52 which includes a valve chamber 52' connected to the lower end of the feed tank 13 through pipe 53 and vented into the upper portion of the tank 13 through pipe 55. The valve chamber 52 contains a float 57 which is connected by a mechanical linkage 59 to valve 51. As a result of this arrangement, any variations in the liquid level in feed tank 13 are operative to control the rate of flow of by-product through valve 51.

A high vacuum is maintained in the feed tank 13 by means of pipe 61 which communicates with the still 17, as will be described hereinafter. By proper arrangement of the structure, the low pressure which is thereby maintained in the tank 13 can be used to cause fresh material to be withdrawn automatically from the storage tank 11 and to flow through pipe 49 and the float controlled valve 51 into the feed tank 13. The feed tank 13, in the illustrated construction, is located above the remainder of the system, and as a result of this arrangement and the maintenance of the interior of the feed tank at still pressure, the liquid by-product flows downwardly, by gravity, through pipe 63 into the heat exchanger 15.

The details of the heat exchanger 15 are not a feature of the invention, and are not shown in the drawings. However, the exchanger 15 should be of a type which is capable of rapidly and uniformly heating the material to be distilled while it flows therethrough. As an example, the heat exchanger 15 may comprise a pair of concentric pipes including an outer pipe 67 and an inner pipe 65 which may be finned and which carries steam or other heating media. In such a structure, the distilland flows in the annular space provided intermediate the pipes 65 and 67. For some operations it may not be necessary to preheat the distilland and, under such conditions, the heat exchanger 15 may be eliminated.

The distilland is then conducted through pipe 71 into the evaporating pan 23 disposed within the still 17. A manually controlled valve 73 is located in this pipe 71, and the valve 73 may be used to adjust the rate of flow of distilland into the still 17.

The various structural features of the still 17 will be more fully described hereinafter. However, within the still 17, the distilland is heated in the evaporating pan 23 by steam or other heating media which passes through the heater 25, constituting an integral part of the evaporating pan 23. The materials evaporated within the still are directed onto the adjacent surfaces of the rotating condenser 21, and such materials as are there condensed are thrown outwardly by centrifugal force and collected in the bottom of the still casing 19. The condensate leaves the still 17 through pipe 75 and is further cooled in heat exchanger 77, if desired. The exchanger 77 may be of the same type as heat exchanger 15, and cool water may be used as the coolant. The distillate passes through pipe 79 from the heat exchanger 77 into storage tank 43 and may be removed from the tank 43 through discharge pipe 81 and valve 83.

In the illustrated apparatus, the by-product material is continuously introduced into the evaporating pan 23 and, accordingly, a pipe 85 is provided for conducting the residue of the distillation process, principally comprising glycerides, higher molecular weight fatty acids and other materials such as sterols, into the tank 41. An outlet pipe 86 and manually operated valve 87 are connected to the lower portion of the tank 41 for removing the residue material as it accumulates.

The cooling system 29, which is used in conjunction with the condenser 21, may be of known type. It is required merely that the cooling system be operative to conduct a coolant through the condenser 21 at a sufficient rate to effect condensation of the distilland within the still. The illustrated cooling system is of the closed circuit type, for use with a refrigerant material such as Freon, and it includes a pipe 89 which communicates with the condenser 21, a compressor or pump 90, an external heat exchanger 91, and the usual valves and controls. In some instances, sufficient cooling of the condenser can be accomplished by simply circulating cool water therethrough. When apparatus of the type illustrated is being used for the recovery of tocopherols at pressures within the range of from about 0.25 to 0.50 mm. of mercury, the coolant should maintain the condenser surface at a temperature within the range of from about 50° F. to 200° F.

In the operation of the distillatory apparatus illustrated in Figure 1 in accordance with the invention, carbon dioxide will be found to be a particularly satisfactory carrier gas, especially for tocopherol recovery. As shown, the carrier gas is introduced into the still 17 by a gas injecting means which includes a gas discharge manifold 27 disposed within the still intermediate the evaporating pan 23 and the condenser 21. The details of the gas injecting means will be more fully discussed hereinafter, and it will be understood that other carrier gases can be used.

When the objective of the distillatory operation is the recovery, or concentration, of a particular material or class of materials, such as tocopherols, it will usually be found highly advantageous, as above noted, to operate the condenser at a particular temperature, or within a particular range of temperatures, most favorable to the condensing of the particular material or materials involved in the operation. This mode of operation promotes the maximum recovery of distillate. At the same time, however, substantial amounts of various materials having lower boiling points than the temperatures maintained at the surface of the condenser, may be evaporated from the distilland contained within the still, and since these materials will not be condensed on the condenser, they will diffuse into the space within the still and into the carrier gas. This action of the liberated materials, which for convenience may be designated as non-condensibles, is undesirable for two reasons. Accumulation and increased concentration of non-condensible gas within the still may contaminate the distillate, and in addition, may prevent re-use of the gas in order to assure a non-contaminated distillate and residue. Accordingly, in the illustrated apparatus, all of the gases liberated within the still, including the carrier gas and the volatile non-condensibles, are continuously removed from the still through a duct 95, which is connected into the vacuum system.

The outflow duct from the still 17, which is connected with the vacuum producing means 31, is also connected by the lines 61 and 61a to the feed tank 13 and the distillate recovery tank 43, as illustrated. Necessary low pressures for the gravity operation of the system are thereby maintained in those tanks.

The gases and vapors leaving the still 17 through the duct 95 pass into the inflow side of the vacuum booster or thermo-compressor 33. The vacuum booster (which is also known as a jet ejector) is a commercially available piece of apparatus, wherein a very high velocity jet of steam is directed axially along a Venturi-shaped passage which extends between the inlet and discharge ends of the apparatus. Steam is supplied to the first booster unit 33 through a steam pipe 97, and the outflow end of that unit connects with the inflow end of the other unit 35. Steam is delivered to the second booster unit 35 via pipe 99. While a single pair of vacuum boosters 33 and 35 are shown in the illustrated apparatus, it will be understood that additional units or pairs of units, connected in series or parallel, may be used in accordance with the requirements of the system. When vacuum equipment of the jet type here disclosed is being operated at very low pressures (with accompanying extremely high steam velocities within the unit), water vapor tends to freeze and to produce ice in the region of the jet orifice. In order to counteract this tendency, a heating jacket, such as is indicated at 101, which surrounds the inflow and orifice portions of the ejector 33 may advantageously be provided. A suitable heating medium, such as steam, is circulated in the jacket 101 through pipes 103a and 103b.

The second vacuum booster 35 discharges into a jet barometric condenser 105, wherein the ejected gases are brought into direct contact with a jet or shower of water supplied to the condenser 105 through pipe 107. Any gases which are not here condensed are withdrawn from the condenser 105 by means of a pair of series-connected jet ejectors 109 and 111 of relatively small size. The actuating steam for these ejectors is provided by pipes 113 and 115 respectively. The final jet ejector 111 discharges gases into the carrier gas recovery means 39 through pipe 117.

The condenser 105 is disposed at the head of a barometric column 119, as shown. With this arrangement, adequate reduced pressure can be maintained in the condenser 105 without requiring the use of vacuum pumps or similar equipment. Where space requirements do not permit the use of a barometric column, a pump can be used, although this will also require the provision of means for maintaining a constant level of water in the jet condenser 105.

Condensible materials which reach the condenser 105 will be there condensed and will be carried down the pipe 119a which consitutes the barometric column into a separator tank 121, where separation can be effected by flotation or by sedimentation. In the processing of the by-product material above described, the condensed material will, in general, be lighter than water, and will accumulate on the surface of the water in the tank 121, where the material will be retained by suitable baffle plates 123 and 123a. The water overflowing from the separation tank is carried away by a pipe 125, and the material separated-out within the tank is removed periodically via a discharge 127.

As previously noted, the invention contemplates the re-use of the carrier material, and to this end, the gases leaving the pipe 117, which gases comprise a mixture of non-condensibles, carrier gas, and some condensibles, are conducted into the carrier gas recovery system 39 which comprises a surface-type condenser 129 and an absorption tower or other gas recovery mechanism 131. Within the gas recovery portion of the apparatus, the carrier gas is continuously absorbed or otherwise separated from any other material present, and by subsequent treatment, returned to the system while the non-condensibles are vented to the atmosphere or otherwise continuously removed from the system.

The pipe 117 is connected to the lower end of the surface-type condenser 129. The condenser 129 comprises a plurality of passageways whose walls are cooled by a cooling jacket 133 to which a coolant such as cool water is conducted via pipes 135 and 135a. However, surface-type condensers other than that described may be employed. In order to remove the condensed material from the condenser 129 and to aid in maintaining a vacuum in the system, the condenser 129 is conveniently connected to the head of the barometric column 119 by the pipe 137. The materials condensed in the condenser 129 will then be carried down the pipe 137 into the pipe 119a and into the separator tank 121.

The materials which are not condensed in the surface-type condenser 129 are withdrawn from the upper end of the condenser 129 by a small-sized jet ejector 145 which is connected to the lower end of the absorbing tower 135 by a duct 147. The actuating steam for the ejector 145 is supplied through pipe 149.

In the tower 131, a liquid absorbing medium is caused to flow downwardly over baffle plates 151 or the like, while in contact with the intermixed carrier gas and non-condensibles. Absorption of the $CO_2$ carrier gas into the absorbing medium thereby results, and the resulting gas-liquid solution containing the combined $CO_2$ then passes through the tower outlet 153 into a trap 155 of conventional construction. The non-condensibles flow to the atmosphere through the vent 156. From the trap 155 this liquid mixture flows into a separation heater 157 which separates the $CO_2$ from the absorbing liquid. The $CO_2$ leaves the heater 157 as a gas via the conduit 159, and the absorbing liquid passes out of the heater as a liquid through pipe 161. A pump 163 which connects with the pipe 161 returns the regenerated absorbing liquid to the top of the tower 131 for recycling through pipe 164. The $CO_2$ gas entering the conduit 159 passes into a pump 165 which returns the carrier gas to the carrier gas injecting means 27, or to a storage tank 167. In view of the fact that $CO_2$ is recovered at a pressure greater than that maintained in the still 17, pump 165 may be eliminated in some installations, and a suitable expansion valve substituted therefor.

In order to remove entrained liquids from the recovered $CO_2$, a surface-type cooler or cooling jacket 166 is disposed along the run of the pipe 159. Any moisture which is condensed in the jacket 166 is conducted to a trap 166a from which the condensed moisture is withdrawn periodically through the valve 166b.

The pressure differential resulting from the provision of the vacuum producing means intermediate the still 17 and absorption tower 131 makes possible the use of a variety of gas absorbing materials having widely varying pressures, at the operating temperature of the tower. As an example, when $CO_2$ is used as the carrier gas, in a system such as that shown in the drawings, ethylene glycol, diethylene triamine, or triethylene tetramine, or a mixture of two or more of the materials can be used for absorbing the carrier gas. Other alkaline compounds such as sodium and potassium hydroxide can also be used. Of course, if a carrier gas other than $CO_2$ is employed, a suitable absorbent for that gas would be employed.

Recovery of the carrier gas may not be complete, and it may be necessary to introduce additional gas into the system during operation. To this end, a storage tank or other source of supply, as shown schematically at 168, may be included in the system. Similarly, a source of supply of additional absorbent liquid is shown at 169.

Under certain operating conditions, the carrier gas may not be completely purged of the non-condensibles or other unwanted contaminants in the tower 131, and further purification may be required in order to completely remove materials diffused in the carrier gas. This may be done in any well known manner as, for example, by passing the carrier gas through activated carbon, etc.

The overall vacuum system should be designed to maintain a high vacuum in the still 17, i. e. pressures below about 1.0 mm. of mercury. The actual pressure in any instance will depend upon the material or materials being treated. For example, in the recovery of tocopherols from the by-product materials of glyceride oil deodorization, the absolute pressure in the still may be from about 5 to 1500 microns during operation.

While various types of stills can be utilized in conjunction with distillatory systems of the general type illustrated in Figure 1, certain important advantages can be realized by the use of stills of special design, and one such still is shown at 17 in Figures 1 and 2. This still, as previously described, includes a vacuum tight casing 19, which is of double-walled construction and is generally cylindrical in form, a rotatable condenser, designated generally as 21, an evaporating pan and heater 23 and 25, and gas injecting means 27. If desired, a cooling or heating media can be circulated through the pipelines 170a and 170b into the space 171 between the double walls of the casing, and the outer wall 173 may be covered with insulation material or lagging. Proper control of the temperature of the walls of the still in combination with control of the temperature of the condenser and the employment of a carrier gas makes possible highest operating efficiencies with substantially all materials.

As shown particularly in Figure 2, the casing 19 includes a generally funnel shaped bottom section 174 which terminates in a drain or distillate outlet 175 and a generally cylindrical main body section 174a in which is provided an outlet port 176. The upper end of the still casing is flat, and a bell shaped housing 178 is integrally attached thereto, in order to provide support for the condenser 21, and the rotating means 179 therefor.

The rotatable condenser 21 is supported in operative position within the casing 19 by a supporting shaft 180. The condenser structure includes a generally funnel shaped upper section 181, which is fabricated from heavy sheet metal and which is integrally attached to the shaft, and a cooperating lower section 183 which is bolted to the upper section 181. The under surface of the lower condenser section 183 defines the condensing surface within the still. As shown in Figure 2, this condensing surface is generally conical in form, it overlies the evaporator pan 23, and it is located as closely adjacent the surface of the distilland as is possible.

As previously described, it is contemplated that the temperature of the condensing surface will be carefully controlled during the operation of the still. Since the condenser is hollow, this control is conveniently accomplished by circulating a heat exchange fluid through the interior of the condenser body. Usually the condenser surface will be cooled, as by the use of a refrigerating system, such as that illustrated at 29 in Figure 1. The coolant or other heat exchange fluid is admitted to the interior of the condenser via a fixedly supported pipe 187 which extends through the hollow shaft 180. The pipe 187 connects at its lower end to a plurality of perforated, tubular arms 189 which extend radially outwardly in the space within the condenser. The cooling liquid emerges from the arms 189 through the perforations or apertures 191, as indicated by the arrows in Figure 2, and is conducted out of the condenser through the annular passageway existing intermediate the pipe 187 and the shaft 180. In this connection, it will be noted that the cooling liquid passes through suitable passageways provided in the bearing bushing 195, which positions and stabilizes the lower end of the shaft 180. The coolant emerges from the annular passageway 193 via an opening, or series of openings, 192, provided in the shaft 180, and which lead into closed collecting pan 194 having a discharge spout 199. The upper end of the passageway 193 is sealed-off by a stuffing box 196 which extends around the pipe 187 and which is bolted to a flanged upper end portion 197 of the shaft 180, as illustrated.

A second stuffing box 199 is provided in the region where the rotatable shaft 180 passes through the casing 19 of the still 17, in order to provide a vacuumtight seal around the rotating shaft support for the condenser 21. When the still is being operated at very high vacuums, it may be found desirable to enclose the stuffing box 199 within an auxiliary seal, within which at least a partial vacuum is maintained. Such a construction is illustrated at 200 in Figure 6, and when it is used, the pressure drop across the stuffing box 199 can be decreased to such an extent that substantially no leakage will occur around the shaft section 180.

The particular auxiliary seal illustrated includes a generally cylindrical pressure vessel 201, which is closed at its upper end by a stuffing box or gland 203, and which is welded or otherwise joined at its lower edge to the outer casing 173 of the still 17.

A pipe 207 connects with the interior of the pressure vessel 201 and this pipe is desirably connected to an auxiliary pump or to some portion of the vacuum system which may have a pressure which is not substantially greater than that maintained in the still 17.

The condenser 21 and its associated shaft 180 are axially supported by a thrust bearing 208, which bearing is in turn supported on the bell shaped housing 178. The thrust bearing 208, which is of the ball bearing type, includes a thrust collar 209 which is press fitted onto the shaft 180, and a cooperating bearing support member 210, which is supported within a suitable recess provided at the end of the housing 178. A sleeve bearing 211, disposed adjacent the thrust bearing 208 cooperates with the bearing bushing 195 at the lower end of the shaft 180 to maintain the parts in proper alignment.

The mechanism 179 provided for rotating the condenser 21 includes a pair of bevel gears, 213 and 215, which may be driven by any suitable means, such as the motor shown schematically at 217 in Figure 1. The gear 213 extends horizontally and is attached to the supporting shaft 180 for the condenser 21 by means of a set screw 218. This gear meshes with the second beveled gear 215 which is keyed to a shaft 219 rotatably journalled in housing 177 in a bearing 221. The shaft 219 is in turn driven by the motor 217.

As pointed out above, the condenser 21 is normally operated to effect selective condensation of the vapors evolved from the distilland; this usually involves operating the condenser so as to maintain a definite temperature or temperature range at the condensing surface. Available automatic control means responsive to the temperature of the coolant leaving the condenser can be used for this purpose, and will not be shown in detail. When used, the control means can be connected into the condenser cooling system, as indicated at 220 in Figure 1.

The evaporating pan 23 and heater 25 used in the illustrative structures shown in Figure 1 of the drawings, comprises essentially a cylindrically shaped container having an open top and a double walled bottom, provided by a plate member 233. The material to be distilled is conducted into the evaporating pan through the pipe 71, and the unevaporated concentrate or residue is conducted out of the evaporating pan by the pipe 85. The operation may be continuous or in batch units, both the inlet and outlet pipes including valves, as indicated at 73 and 235, which may be adjusted to obtain the type operation desired. Pipes 237 and 239 are provided for circulating a heating media through the heater chamber 25, which is separated from the evaporating chamber 23 by the common wall 233.

As before noted, I have discovered that greatly improved high-vacuum distillatory and drying operations can be accomplished, particularly in short-path stills, by introducing a carrier gas into the still during its operation, this gas being directed across the surface of or through the material being treated. In the apparatus illustrated in Figs. 1, 2, and 3, the gas injecting means 27 is used for this purpose. This means includes a pair of semicircular tubular manifolds 241 which are disposed in opposed relation adjacent the top of the evaporating pan and thus above the surface of the distilland in the evaporating pan 23. Conveniently, manifolds 241 are supported on the upper edge of the evaporating pan, as shown in Figure 2.

The tubular manifolds 241 are provided with suitably positioned discharge orifices 243 which direct the carrier gas inwardly of the evaporating pan and across the surface of the material contained therein. In the construction shown in the drawings, the discharge orifices 243, which are of very small diameter, are disposed along the inner periphery of the manifolds 241. Desirably the orifices 243 are so positioned that the gas discharged therethrough will have the greatest possible effect in moving vaporized material to and across the condensing surface of the condenser. For example, in the disclosed structure, the orifices produce more or less diametrically opposed streams of carrier gas which flow inwardly of the evaporating pan in a generally radial direction. Vapor molecules liberated at the surface of the material in the evaporating pan are thereby carried toward the central portion of the condenser before passing out of the region of the condenser. As a result, the vaporized material has an increased opportunity of contacting the condenser surface and more efficient operation is realized. Pipes 245 and 247 are provided for conducting the carrier gas to the respective manifold 241, and these pipes are in turn connected to the gas supply line from the pump 165 and the gas storage unit 167.

The rotary motion which is imparted to the condenser 21 during normal operation of the apparatus accomplishes two important results. First, there is a cooperative action between this motion of the condenser and the directed stream or streams of carrier gas, which materially aids in improving the efficiency of the condensing action, with resulting increase in the yield of the desired material. Second, the rotary motion of the condenser, which extends radially beyond the rim of the evaporating pan, can be used to effect continuous removal of the condensed materials from the condenser surface and the movement of such materials from the condensing region to the lower end of the still, for subsequent removal from the distillation chamber. To aid this latter operation, and especially to maintain the condensing surface of the condenser as free as possible from condensed material, the apparatus desirably includes a scraper such as the blade illustrated at 249 in Figure 2. This blade, which is bolted to the still casing, extends inwardly and outwardly along the under surface of the condenser, and is operable to effect continuous removal of the material condensed thereon.

Through the use of a double walled still as has been described and the provision of means for circulating a heating or cooling medium therethrough, the temperature of the inner surface of the still wall can be controlled so that the materials being condensed will not re-vaporize. Moreover, under some conditions the walls may be heated to prevent unwanted materials from condensing on the walls and contaminating the product.

In the recovery of material, such as tocopherols from the deodorization by-product material described in the foregoing, the condenser 21 which is 24 inches in diameter may be rotated at a speed which is within the range of from about 100 to 1000 R. P. M. It will be understood that the speed of rotation of the condenser in a structure of this type will depend, in any given instance, upon various factors, including physical dimensions, of the still and the type of material being recovered. Generally, the speed should be sufficient to effect continuous and efficient cleaning of the condenser surface, with or without scraper means, during the operation of the distillatory apparatus. Further, the condensed material should be discharged from the condenser at a sufficient velocity to prevent its falling back into the evaporating pan. Generally, speeds of rotation of the condenser which are sufficient to accomplish the desired continuous removal of the condensed material will also be sufficient to attain that degree of intermixing of the carrier gas and vaporized material, which results in the most efficient condensing action.

The amount of carrier gas which is used will also depend upon several factors. Of these, the relative amount of recoverable material contained in the vapor evaporated from the material being treated is possibly the most important. Where the vapor is relatively rich in recoverable material, the amount of carrier gas used can vary over a somewhat wider range than is the case when the evaporated material contains a relatively small amount of material to be separated therefrom by a condensing action. Also, there are mechanical limitations resulting from the vacuum capacity of the system, which must be taken into account in the operation of any given equipment.

Other examples of apparatus suitable for carrying out the objects of the present invention are shown in Figs. 4 and 5, which illustrate modified types of evaporation units and gas injection means adapted for use with distillatory apparatus of the general type disclosed in Figure 1. The apparatus of Figure 4 includes an evaporating pan 23 and associated heater 25 similar to those previously described in conjunction with still 17. However, in the Figure 4 construction, the carrier gas is injected into the liquid contained in the evaporating pan below the surface of that liquid. This may be accomplished by various means, for example, a nozzle or a perforated pipe may be positioned within the evaporating pan below the normal level of the liquid contained therein.

It has been found, however, that much more effective dispersion of the carrier gas can be accomplished in this type apparatus by the use of the particular gas injector means shown at 251 in Figure 4. The means includes a generally cup-shaped support 252 having a base which is adapted to be affixed to the bottom section 233 of the evaporating pan. An inlet pipe 253 for the carrier gas connects with the interior of the support 253, as illustrated, and a block 254 of carbon or other fine-grained porous material is seated in the upper end of the support. The carbon block 254 is held in place by a cap 255 which is threaded onto the upper end of the support. A circular opening is formed in the cap 255 so as to expose the upper surface of carbon block to the material in the evaporating pan. In operation, the carrier gas is forced through the carbon block 254, and is thereby released in a very finely divided state into the material being distilled. Improved intermixing of the gas and the distilland with increased efficiency of distillation results. While only a single gas injection unit is shown in Figure 4, it will be understood that additional injection units can be employed, if required.

When the carrier gas is dispersed directly in the distilland, it is highly desirable to use a gas which will not produce frothing at the surface of the distilland. If a gas such as wet steam is used, for example, the resulting frothing at the surface may impair the efficiency of separation, or even prevent operation of the apparatus.

A modified evaporating apparatus, designated generally as 256, is shown in Figure 5, this apparatus being operable to spread the distilland in a thin film over a heated surface which is positioned closely adjacent the condensing surface. This modified apparatus comprises a generally dish shaped member 257 of double-walled construction, which is provided with an upwardly extending, centrally disposed, portion 259 adapted to extend into close proximity to the condenser which is used with the apparatus. The dome-shaped portion 259 provides the surface over which the distilland is filmed, and may include a plurality of ridge sections as shown at 261 for producing a cascade action.

Heating of the domed surface is effected by introducing a suitable heating medium, such as steam, into the space between the walls of the member 257. Preferably, the heating medium is introduced into the apparatus through a centrally disposed pipe 271, which discharges directly against the dome portion 259. A discharge pipe 273 for the heating medium is also provided.

The distilland may be introduced into the apparatus 256 through a pipe 275 which is rigidly attached to the side of the member 257 and which discharges the distilland liquid onto the top portion of the dome 259. Other means for introducing the distilland may be provided, as for example, a pipe which extends upwardly through the heating chamber and overflows at the top of the dome. A discharge pipe 277 for the residue material connects with the annular edge portion of the dish member 257, as shown. The outlet of this pipe may be positioned somewhat above the bottom of that member to permit a measured accumulation of distilland.

The carrier gas is preferably introduced into the evaporating means 256 at the base of the dome 259 and is directed across the dome surface so as to carry the distilland vapors there produced into positive contact with the associated condenser. This may be accomplished through the provision of a tube or manifold 278, having suitable gas discharge orifices provided therein, which extends around the base of the dome 259 and communicates with a carrier gas inlet pipe 279.

When starting-up the system illustrated in Figure 1, the various valves controlling the rate of feed of distilland, the delivery of carrier gas, etc. were first closed off. Then, the several elements of the vacuum producing system, including the vacuum boosters and ejectors 33, 35, 109, 111, and 145, were placed in operation, and a barometric column was established in pipe 119a and in pipe 137a. In the operation of such a system for the concentration and recovery of tocopherols from the by-product of glyceride oil deodorization, described above, a vacuum within the range of from about 0.25 to 0.50 mm. of mercury absolute was maintained in still 17. In the provision of this vacuum, the ejector or vacuum booster 35 was operated under such conditions that a pressure within the range of from about 4 to 10 millimeters of mercury was maintained at the inlet side thereof; the outlet side of the unit, which connects with the jet condenser 123 at the head of the barometric column 119, was operated at from about 15 to 25 millimeters. The other booster unit 33 was operated to produce a pressure at the inlet side thereof of about 0.25 to 0.50 millimeter of mercury. Operating under such conditions, it was found that each of the thermocompressors 33 and 35 required from about 550 pounds of steam per hour at a pressure of 100 pounds per square inch, gage, and a temperature of 330° F., and that the desired absolute pressure of from 0.25 to 0.50 millimeter could be maintained in the still 17 even though carrier gas and non-condensibles equivalent to about 5 pounds of steam per hour were passed through the ejector units 33 and 35.

After the vacuum had been established in the apparatus and stable conditions attained, the by-product material which contained from about 6 to 10 per cent tocopherols, was introduced into the system from the storage tank 11, the material passing through the feed tank 13 and the heat exchanger 15 before reaching the evaporating pan 23, within the still 17. In the heat exchanger 15, the by-product material was heated to a temperature of about 450 to 550° F. The valve 73 was adjusted to fix the rate at which the by-product material passed into and through the still 17 at about 30 pounds per hour of the by-product material.

Within the still 17, the by-product distilland material was heated to maintain a temperature within the range of from about 450 to 550° F. and carbon dioxide gas was used as a carrier. The carrier gas was introduced into the still 17 at the rate of about 1.5 pounds per hour, i. e. about 0.03–0.05 pound of carrier gas per pound of the by-product being treated. The condenser 21 in this system was 24 inches in diameter, and the associated cooling system 29 maintained the condensing surface of the condenser at a temperature of approximately 150° F. The condenser was rotated at 350 R. P. M. Under these conditions, approximately 9 to 10 pounds of condensed distillate were obtained per hour, the distillate containing from about 16 to 25 per cent of tocopherols.

As previously noted, the operation of short-path, distillatory apparatus, such as the system described in the foregoing, can be improved in certain instances by introducing a low-boiling point liquid having a high vapor pressure into the still as part of the distilland. This is especially valuable when materials which are very sensitive to heat, such as coffee extract flavors, are to be recovered. When such a liquid is added to the material to be distilled, care should be exercised to select a material which will not be reactive with the other materials present, and it is quite desirable that the added liquid should be immiscible with the other components of the distilland. This added material may be used in systems wherein a carrier gas is used, as described above, or by proper selection of the added material, a carrier gas may be produced by evaporation of the added material itself. Examples of materials suitable for this purpose are tri-chlor ethylene and ether (ethyl).

When these added materials of low boiling point are used, it is desirable that the material selected will not produce a vapor which condenses in the still, unless such condensate is immiscible with, or readily separable from, the material which is to be recovered. As in the case of an added carrier gas, it may be desirable to recover the vapor products of the added materials. This may be done by the use of an absorption tower or equivalent procedure, as described above.

While the system which has been described is operable to produce a vacuum of from 0.25 to 0.50 millimeter of mercury, it may be readily modified to produce a vacuum of from 5 to 50 microns of mercury. These low vacuum conditions are desirable for the processing of some products and the use of a carrier gas under these vacuum conditions has been found particularly effective. A modified system for producing vacuums with a magnitude of from 5 to 50 microns is illustrated in Figure 7.

The system shown in Figure 7 is similar to the system shown in Figure 1 except that a fore pump and a cooling stage is provided in addition to vacuum boosters, jet condensers, etc. The system includes storage tanks, preheaters, control valves, etc., for the distilland as well as a still 17' which is provided with means for introducing into the system a carrier gas or a material which is capable of producing a carrier gas under the conditions maintained within the still. The construction of the still 17' is the same as the construction of the improved stills which have been described. For the purpose of brevity, only the modified vacuum producing means will be described in detail, but it will be understood that the various pieces of apparatus necessary to carry on distillation in the still 17' will be present in the system.

The gases and vapors which are withdrawn from the still 17' of Figure 7 through a duct 95', include the carrier gas, other non-condensibles, and the vapors of condensible material which remain vaporized under the conditions within the still 17. These gases are conducted into the inlet side of a fore pump 281 which may be either of the mechanical or vapor type. However, the fore pump is preferably of the vapor type and desirably employs a fluid or vapor which has a low vapor pressure. Particularly good results have been obtained in the system by employing a fore pump in which octoil (n-ethyl hexyl phthalate) vapors are employed. The fore pump 281 is adapted for use with octoil and comprises a piece of apparatus wherein a very high velocity jet of octoil vapor is directed axially along a Venturi-shaped passage which extends between the inlet and discharge ends of the apparatus. The vaporized octoil is supplied to the inlet end of the unit through a pipe 283 and the outflow end of the Venturi-shaped passageway connects with the inlet of a dry or surface-type condenser 285 which also constitutes a part of the pump 281. In the condenser 285 the octoil vapors and a large portion of the condensibles from the still 17' are converted to a liquid which flows through an outlet 287 into a trap 289. From the trap 289 the liquid mixture is pumped by a pump 290 into a separation heater 291 which effects the removal of the lower boiling point condensibles from the liquid octoil by vaporization. These vaporized condensible materials are recondensed in a condenser 293 and are removed from the system. The purified liquid octoil is then conveyed by a pump 295 through a pipe 296 to a boiler 297 wherein the octoil is again vaporized and conducted through a pipe 299 to the pipe 283. In the event it is necessary to further purify the octoil, a purifying unit 301 is provided in parallel with the pipe 296, and the flow of octoil through the purifying unit may be controlled by the valves 303a, 303b, and 303c.

It will be understood that while the above description is directed to the use of octoil, other vacuum pump oils having a low vapor pressure may be employed, e. g. n-butyl phthalate (vapor pressure $2 \times 10^{-4}$ mm. of mercury), n-amyl phthalate (V. P. $2.5 \times 10^{-5}$ mm. of mercury), n-hexyl phthalate (V. P. $3 \times 10^{-6}$ mm. of mercury), etc.

The gases and uncondensed vapors leaving the condenser 285 are then cooled by passing them through an outlet pipe 305 which is surrounded by a cooling jacket 306. The cooling effects a reduction in the volume of the vapor and gases. The condenser 285 and the cooling jacket 306 may be cooled by passing cool water therethrough, however, it has been found desirable under some operating conditions to cool the cooling jacket 306 with a refrigerant such as Freon. Under the preferred operating conditions, the temperature in the condenser 285 is just low enough to condense the octoil thus permitting the greater portion of the vapors from the still 17' to pass into the pipe 305. The cooling jacket 306 is then maintained at a low temperature to condense other condensible material thereby reducing the load on the vacuum system.

The condensed vapor from the pipe 305 flows through a valved pipe line 306a, to a receiving tank 306b. The collected liquid periodically is drawn from the tank 306b through the valved pipe line 306c by a pump 306d.

The cooled vapors and gases from the pipe 305 pass into the inflow end of a vacuum booster or jet ejector 307 which is similar to the booster 33 which has been described. Steam is supplied to this booster unit through a steam pipe 308, and the outflow end of the unit connects with the inflow end of a second booster unit, indicated as 309 in Figure 7, this unit being similar to the unit 35 which has been described. Steam is delivered to the second booster unit through a pipe 310. It will be apparent that although a single pair of vacuum boosters are shown in the system, additional boosters or pairs of boosters connected in series or parallel may be used in accordance with the requirements of the system. It will be noted that the booster unit 307 is jacketed with a heating unit 311 which is similar to the heating unit 101 which was described in connection with the system of Figure 1.

The second vacuum booster 309 discharges into a jet condenser 313 wherein the ejected gases are brought into direct contact with a shower of water supplied through a pipe 315. The condenser 313 is connected through a barometric column 317 to a separating tank 319, which is similar to the tank 121 which has been described.

The gases from the jet condenser 313 are passed into a surface-type or dry condenser 319, the gases being conveyed by a pair of series connected, small-sized jet ejectors 321 and 323 whose actuating steam is provided through pipes 325 and 327, respectively. The final ejector 323 discharges the gases into the lower end of the surface-type condenser through a pipe line 329. The surface condenser 319 which is similar to the condenser 129 which has been described, is connected to the barometric column 317 of the condenser 313 through a pipe line 331 and a header 333.

The materials which are not condensed in the surface-type condenser are withdrawn from the upper end of the condenser by a single, small-sized jet ejector 335 which is connected to the lower end of an absorbing tower 337 by a duct 339. The actuating steam for the ejector 335 is supplied through a pipe 341. The absorbing tower 337 and the absorbing system is similar to that which has been described in connection with the system 39 of Figure 1, but it will be understood that the absorbent employed will depend upon the carrier gas used.

In the tower 337, a liquid absorbing medium flows downwardly over baffles 343 in contact with the intermixed carrier gas and non-condensibles. As a result of the contact, the carrier gas is absorbed and the resulting gas-liquid solution passes through the outlet 345 of the tower 337 into a trap 347.

From the trap 347, the liquid mixture flows into a separation heater 349 which separates the carrier gas from the absorbing liquid. The carrier gas leaves the heater as a gas through the conduit 351 and the absorbing liquid passes out of the heater as a liquid through a pipe 353. A pump 355 is connected with the pipe 353 to return the regenerated absorbing liquid to the top of the tower 337 for recycling through a pipe 357. The carrier gas in the conduit 351 passes into a pump 359 and is returned to the carrier gas injecting means 27 in the still 17'. Storage tanks or the like (not shown) may be provided for the carrier gases and absorbent as in the system of Figure 1.

The gas conduit 351 includes a means for separating condensible vapors from the carrier gas. This separating means includes a surface condenser or cooling jacket 352 which drains into a trap 352a through which condensate is withdrawn through valve 352b.

The distillatory system shown in Figure 7 may have substantially the same capacity as the system shown in Figure 1. It has been found that the fore pump 281 in combination with the cooling stage intermediate the octoil condenser 205 and the first vacuum booster 307 will reduce the pressure in the still to the 5–50 micron range even though substantial amounts of carrier gas are introduced into the still. The extremely low pressures which are obtained in a system of this type in combination with the feature of introducing a carrier gas into the system make possible greatly improved drying and distillatory procedures which may proceed at relatively rapid rates.

As has been pointed out previously, it is desirable under some operating conditions to remove the carrier gas from the system prior to the point at which the gases enter the main vacuum producing means. This enables a reduction in the capacity of the vacuum producing means or makes possible the obtaining of higher vacuums with relatively simple equipment. In the system illustrated in Figure 8, the carrier gas is separated from the vaporized materials discharged from the still before the gases are passed into the vacuum system.

In the system of Figure 8, the carrier gas, non-condensibles, and vapors leaving the still 17" through the duct 95" pass into the inlet of one of a pair of parallel connected absorbing towers 361.

In the absorbing towers 361 the carrier gas is removed from the gas-vapor mixture prior to the point at which the admixture of gases pass into the main vacuum producing means. In the event that carbon dioxide is employed as a carrier gas, the absorbing towers may contain trays of soda-lime or other suitable absorbents for carbon dioxide having low vapor pressures, i. e. vapor pressures below that which are to be maintained within the still. However, if it is found necessary to employ an absorbent which has a vapor pressure greater than the pressures to be maintained within the still 17", a fore pump (not shown) may be disposed intermediate the still and the absorbing towers 361. A valve 363 is provided at the inlet and outlet of each of the towers 361 so that the flow of gas and vapor may be routed through either or both of the towers. By this procedure, one of the towers 361 may be in operation while the other of the towers 361 is being cleaned or regenerated. As is shown in the drawing, a cooling jacket 365 may be provided about the pipe 95" intermediate the still 17" and the absorbing towers 361 to effect a reduction in the volume of the gases and vapors which are passed into the towers 361. Vapors condensed by the cooling jacket 365 flow into a receiving tank 366 through a valved pipe line 366a. Periodically, the accumulated liquid is withdrawn from the tank 366 through a valved pipe line 366b by a pump 366c.

The gases and vapors leaving the outlets of the absorbing towers 361 pass through pipe 367 into the inflow side of a vacuum booster or jet ejector 369 which is similar to the booster 33 which has been described. Steam is supplied to the booster unit 369 through a steam pipe 370 and the outflow end of the unit is connected with the inflow end of another booster unit indicated as 371 in Figure 8, this unit being similar to the unit 35 which has been described. Steam is conducted into the second booster unit 371 through a pipe 372.

The second booster unit 371 discharges into a jet condenser 373 wherein the ejected gases are brought into direct contact with a spray of water supplied through a pipe 375. The condenser 373 is connected through a barometric column 377 to a separating tank 379 which is similar to the tank 121 which has been described.

The gases from the jet condenser 373 are discharged to the atmosphere or to a recovery system through a pair of series connected jet ejectors 381 and 383 whose actuating steam is provided through pipe lines 385 and 387, respectively. The final ejector 383 in the illustrated system, discharges the gases into the atmosphere through a pipe 389.

In the foregoing, there have been disclosed certain novel distillatory procedures and apparatus which are applicable to high vacuum, distillatory operations, and particularly to such operations which involve the use of short-path type stills. Included among the more important novel concepts disclosed are the introduction of a carrier gas into a high vacuum still during the operation thereof; the provision of improved apparatus and systems whereby the use of such carrier gas will not materially increase the load on the vacuum producing equipment, as compared with systems wherein a carrier gas is not used; the concept of conducting high vacuum distillatory operations under such conditions that there is a continuous removal of the vaporized products and carrier gas, if used, from the region of the still and the region of the condenser; the concept of mixing the material to be distilled with other vaporizable materials, thereby to effect a lowering of the normal operating temperature of the still or an increase in the permissive pressure within the still; the employment of such an additive material which, in addition, liberates a carrier gas within the still; the concept of controlling the temperature of the walls of the still to effect a control upon the re-vaporization of the condensate and upon the condensing of unwanted materials; and various, improved evaporating, condensing and other apparatus, especially adapted for use in high vacuum distillatory systems of the subject type.

The invention makes possible greatly increased yields and greatly increased operational efficiency when applied to high vacuum distillatory operations, and especially those using stills of the short-path type. In addition, the invention makes possible much more selective and efficient separation of desired distillate components, under such conditions of temperature and pressure that the possibilities of heat or other damage to the materials being distilled and recovered are greatly minimized.

Various of the novel features of the invention believed to be new are set forth in the following claim.

I claim:

In a distillatory system of the class described, a short-path still which includes a casing, an evaporating pan within said casing, and a condenser which is also located within said casing and which is in close proximity to said evaporating pan, a main vacuum producing means which is connected at its inflow end to said casing, a surface type condenser which is connected at its inflow side to the outflow end of said main vacuum producing means, a gas absorption means which is connected at one end to the outflow end of said surface-type condenser and which is vented at its other end to the atmosphere, means for introducing a liquid material to be distilled into said evaporating pan, means for removing condensed distillate from the interior of said still, means for continuously introducing a carrier gas uncontaminated with vapors of the distilland into said still in the region of the surface of the liquid material for aiding in the movement of vapors liberated from the surface of the material being distilled to the surface of said condenser, said main vacuum producing means being operable to effect the continuous removal from said still of said carrier gas and any vapors from the material being distilled which are not condensed on said condenser, said gas absorption means being operable to withdraw said carrier gas continuously from said system, and means for reclaiming the gas absorbed in said absorption means and for recirculating said reclaimed gas through said system.

References Cited in the file of this patent

UNITED STATES PATENTS

| Number | Name | Date |
|---|---|---|
| 516,924 | Du Pont | Mar. 20, 1894 |
| 662,172 | Muller | Nov. 20, 1900 |
| 1,023,133 | De Jahn | Apr. 16, 1912 |
| 1,913,882 | Hills | June 13, 1933 |
| 2,073,327 | Vigers | Mar. 9, 1937 |
| 2,095,578 | Theiler | Oct. 12, 1937 |
| 2,117,803 | Hickman | May 17, 1938 |
| 2,210,927 | Hickman | Aug. 13, 1940 |
| 2,310,399 | Cox | Feb. 9, 1943 |
| 2,313,175 | Scott | Mar. 9, 1943 |
| 2,358,272 | Willkie | Sept. 12, 1944 |
| 2,361,411 | Murphy | Oct. 31, 1944 |
| 2,372,540 | Balcar | Mar. 27, 1945 |
| 2,375,288 | Dennis | May 8, 1945 |
| 2,427,718 | Denys | Sept. 23, 1947 |
| 2,437,594 | Denys | Mar. 9, 1948 |
| 2,538,540 | Thurman | Jan. 16, 1951 |

FOREIGN PATENTS

| Number | Country | Date |
|---|---|---|
| 596,392 | Great Britain | Jan. 2, 1948 |